Aug. 24, 1954  E. FREYSSINET  2,686,963
METHOD OF ANCHORING REINFORCEMENTS
Filed Sept. 15, 1948
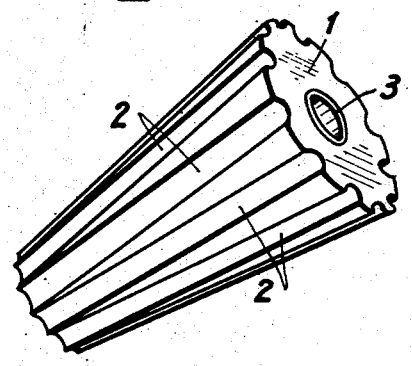
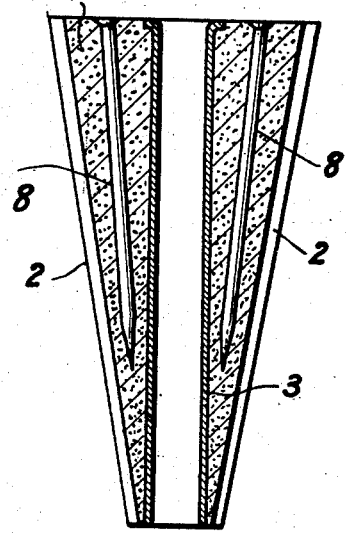
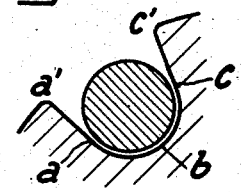
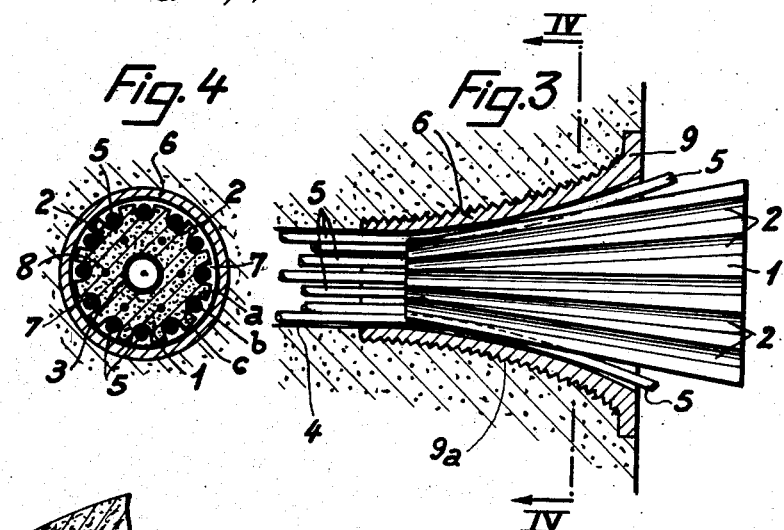
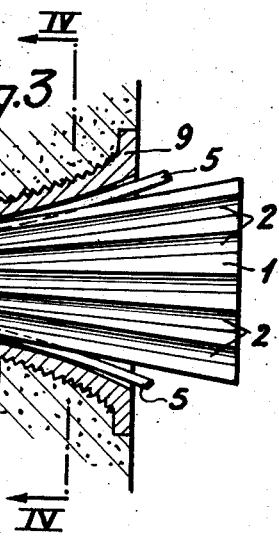
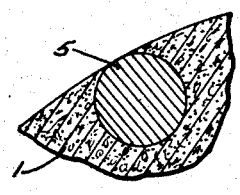
INVENTOR
Eugène Freyssinet
By Watson, Cole, Grindle + Watson Patented Aug. 24, 1954

2,686,963

UNITED STATES PATENT OFFICE 2,686,963

METHOD OF ANCHORING REINFORCEMENTS

Eugene Freyssinet, Neuilly-sur-Seine, France

Application September 15, 1948, Serial No. 49,377

Claims priority, application France April 27, 1948

2 Claims. (Cl. 29—525)

I have already described in my prior Patents No. 2,270,240 and No. 2,618,147 an arrangement for anchoring previously stressed reinforcements, more particularly suitable for cable reinforcements.

This arrangement includes, in register with the end of the cable, a frusto-conical wall operatively connected to the mass to which a preliminary stress is to be given and against which the strands of the reinforcing cable to be anchored are strongly fastened by a frusto-conical wedge engaging it under high pressure. This wedge may be constituted by a casing of sheet metal or by a hoop of hard steel filled with concrete and it may include an axial tube allowing the injection under pressure of the protecting cement into the recess provided for the reinforcement in the mass submitted to a preliminary stressing.

My invention has for its object improvements in the anchoring means wherein the wedge is constituted by concrete without any outer casing enclosing it, the fastening of the reinforcing strands being performed through direct contact with the concrete of the wedge so as to benefit to a maximum by the plastic deformation of the concrete obtained by pressure, so as to secure a uniform tightening of the various reinforcing strands even if the diameters of these strands show substantial differences.

This improvement provides an important advantage inasmuch as it is possible to use for the constitution of reinforcing strands not only drawn wire of comparatively regular diameter but also filaments obtained through extrusion or rolling at high temperature or at room temperature and the variations in gauge of which may be fairly large.

Preferably the concrete wedge is provided with recesses of a substantially cylindrical shape intended for the housing of the reinforcing strands to be anchored and matching substantially the shape of these strands.

The following description and accompanying drawings which are employed by way of exemplification and by no means in a limiting sense, will show how the invention may be executed and the various features appearing both in the drawings and in the specification form of course part of the invention. In said drawings:

Fig. 1 is a perspective view of an embodiment of the wedge according to my invention.

Fig. 2 is a longitudinal section thereof.

Fig. 3 is a longitudinal section of a complete anchoring system incorporating my improved wedge.

Fig. 4 is a transversal cross-section of this arrangement including the tightening wedge.

Fig. 5 is a transversal cross-sectional view at a larger scale of one of the recesses provided in the wedge for the armature strands. Figure 5a is a view similar to Figure 5 illustrating the ideal condition existing after the wedge has ben plastically deformed.

The wedge illustrated in the drawings is constituted by a frusto-conical body 1 of molded concrete showing a high resistance to compression, the granular structure and the composition of the concrete being carefully chosen in order to achieve this result while the molding may be carried out, as well known per se, under vibratory conditions and under compression. The frusto-conical surface of the wedge thus obtained is left bare, in other words it is not enclosed in a sheath or binding or hoop of steel as described in my prior patents referred to hereinabove. In said frusto-conical wall of the wedge, it is sometimes desirable to provide, in the casting, recesses 2 directed substantially along generating lines of the wedge and the number of which corresponds to that of the strands of the reinforcement to be anchored, each recess showing cross-sectionally the shape of a half-cylinder $a$—$b$—$c$ the diameter of which is substantially equal to that of the strands or slightly greater, said half cylinder extending laterally under the form of flaring surfaces $aa'$, $cc'$ to further the introduction of the reinforcing strands (Fig. 5).

The wedge may be provided with an inner tubular metal core 3 that may serve for the subsequent injection of cement or of another substance into the channel containing the reinforcement.

The reinforcement being inserted in each channel 4 provided inside the mass that is to be reinforced (Fig. 3) and the different strands of said reinforcement 5 opening into contacting relationship with the wall of the frusto-conical opening 6 forming an extension of said channel at the end thereof, the wedge is urged axially into said opening whereby the strands are housed in the various recesses 2 of the wedge. This introduction of the wedge may be executed by means of a jack already described in my prior patents, said jack allowing a preliminary stress to be given to the reinforcing strands and keeping them stretched during the wedging operation while an extremely high pressure is exerted on the wedge the reaction of which pressure is absorbed by the reinforcement itself.

The contacting surface between the wedge and each strand is considerable as it is formed by the entire half surface of the strand. The pressure exerted on the wedge is generally higher than the rate of resistance of the concrete to compression so that the latter is plastically deformed and fills up all the open spaces, as shown in Figure 5a, that is the spaces remaining open by reason of an uneven gauge of the reinforcing wires or else those constituted by the spaces 7 required for the correct positioning of the strands with reference to the wedge.

The wedge concrete is longitudinally bound by reinforcements 8 that may be constituted by mere nails. The member inside which a frusto-conical opening 6 is provided, the shape of which matches that of the wedge, may be a previously cast concrete member that is then provided with a hoop wound in tight convolutions over the inner wall of the opening and the outer wall of the member. The member considered may also be constituted by a cast steel body.

This latter case has been illustrated in Fig. 3: the tubular steel body defining the opening 6 is provided outwardly with projecting flanges 9 adapted to bear against the concrete 10 of the reinforced part. The tubular body may include striations, regular or otherwise, as illustrated at 9a in Fig. 3. In Figure 3, the curvature of the sleeve 6 has ben exaggerated for ready visibility. The purpose of the curvature is to avoid having a sharp bend or angular elbow in the reinforcement wires 5, being conventional and having nothing to do with the invention. The wedge, when deformed, does not completely fill the sleeve 9 (unless its size has been accurately determined for that purpose, but in practice the wedge is very roughly designed). When the wedge is inserted into the sleeve, contact between the wires 5 and the surfaces of 6 and 1 occurs along a relatively short distance somewhat along the wedge. As the latter is forced in and undergoes plastic distortion, the contacting zone progressively extends. Eventually, a part of the length of the sleeve is filled.

Obviously, many modifications may be made in the arrangement that has just been described, in particular by substituting technically equivalent means for those disclosed, without departing from the scope of the invention as defined in the accompanying claims.

What I claim is:

1. A method for anchoring reinforcement wires in a member having an inwardly tapering cavity along the wall of which portions of said wires are spread, said method comprising the steps of inserting between said portions and in contact therewith a bare-surfaced wedge of hardened concrete the general shape of which is that of said cavity, for engaging said portions between said wall and the bare concrete surface of said wedge, and forcing said wedge inwardly of said member with a pressure sufficient for causing plastic deformation of the hardened concrete of said wedge to the extent that empty space around said portions is filled with plastically deformed hardened concrete.

2. A method as recited in claim 1 and further comprising the step of positioning said wires in recesses in the hard surface of said wedge.

References Cited in the file of this patent

UNITED STATES PATENTS

| Number | Name | Date |
|---|---|---|
| 985,915 | Marchand, Jr. | Mar. 7, 1911 |
| 2,371,882 | Freyssinet | Mar. 20, 1945 |

FOREIGN PATENTS

| Number | Country | Date |
|---|---|---|
| 424,006 | Great Britain | Feb. 13, 1935 |
| 541,160 | Great Britain | of 1941 |
| 541,437 | Great Britain | Nov. 26, 1941 |
| 561,716 | Great Britain | June 1, 1944 |